United States Patent [19]

Maiale, Jr. et al.

[11] Patent Number: 5,038,081

[45] Date of Patent: Aug. 6, 1991

[54] REVERSE PHASE-CONTROLLED DIMMER

[75] Inventors: Nicholas F. Maiale, Jr.; Donald F. Hausman, both of Emmaus, Pa.

[73] Assignee: Lutron Electronics Co., Inc., Coopersburg, Pa.

[21] Appl. No.: 133,712

[22] Filed: Dec. 16, 1987

[51] Int. Cl.$^5$ .................... H05B 37/02; G05F 1/44
[52] U.S. Cl. .................... 315/291; 315/194; 315/307; 315/DIG. 4; 323/243; 323/326
[58] Field of Search ................ 315/194, 291, DIG. 4, 315/307; 323/242, 243, 326, 905

[56] References Cited

U.S. PATENT DOCUMENTS

| | | | |
|---|---|---|---|
| 4,099,099 | 7/1978 | Grudelbach | 315/194 |
| 4,350,935 | 9/1982 | Spira et al. | 315/291 |
| 4,507,569 | 3/1985 | Hess | 315/291 X |
| 4,527,099 | 7/1985 | Capewell et al. | 315/291 |
| 4,528,494 | 7/1985 | Bloomer | 323/237 |
| 4,540,893 | 9/1985 | Bloomer | 307/248 |
| 4,547,828 | 10/1985 | Bloomer | 361/86 |
| 4,563,592 | 1/1986 | Yuhasz et al. | 307/115 |

FOREIGN PATENT DOCUMENTS 0200827 11/1986 European Pat. Off. .
0263966 4/1988 European Pat. Off. .

OTHER PUBLICATIONS

R. M. Burkhart et al., *IEEE Trans. Ind. Appl.*, vol. 1A-15, pp. 579-582, Sep./Oct., 1979.
R. M. Burkhart et al., *IEEE Trans. Ind. Appl.*, vol. 1A-8, pp. 84-88, Jan./Feb., 1972.
C. F. Christiansen and M. Benedetti, *IEEE Trans. Ind. Appl.*, vol. 1A-19, pp. 323-327, May/Jun., 1983.

*Primary Examiner*—Eugene R. LaRoche
*Assistant Examiner*—M. Shingleton
*Attorney, Agent, or Firm*—Seidel, Gonda, Lavorgna & Monaco

[57] ABSTRACT

Reverse phase-controlled dimming of an a.c.-powered load is accomplished by switching power to the load on and off during each half cycle. In one embodiment of the present invention, power is switched on when line voltage is substantially equal to load voltage and off at a selected time later in the half cycle or at any time that the voltage across the switch exceeds a predetermined value. Preferably, switching is accomplished with a pair of field effect transistors. The load preferably includes a capacitor from load hot to neutral. The present circuit permits quiet dimming of incandescent lamp loads without the need for complex circuitry. It is particularly well adapted for dimming low voltage lamps using a solid state transformer.

21 Claims, 2 Drawing Sheets

REVERSE PHASE-CONTROLLED DIMMER

BACKGROUND OF THE INVENTION

1. Field of the Invention

This invention relates to a circuit for reverse phase-controlled dimming of an a.c. load.

2. Description of the Related Art

Phase-controlled dimming is accomplished by switching a.c. power to the load on and off during each half cycle. The amount of dimming is determined by the ratio of "on" to "off" time. In conventional phase-controlled dimming, the power is off at the beginning of each half cycle (i.e., at the zero crossing) and turns on later during the half cycle. In reverse phase-controlled (RPC) dimming, the power to the load is switched on at or near the zero crossing and is switched off later in each half cycle.

RPC dimming of gas discharge lamps was disclosed in U.S. Pat. No. 4,090,099, issued July 4, 1978, to Grudelbach. (See also U.S. Pat. No. 4,350,935, issued Sept. 11, 1982, to Spira et al., and U.S. Pat. No. 4,527,099, issued July 2, 1985, to Capewell et al.) The circuit disclosed in the Grudelbach patent includes a capacitor ($C_1$ in FIG. 4) from load hot to neutral. The circuit serves to dissipate the energy stored in the inductors that serve as ballast for the gas discharge lamps. Incandescent lamps have no ballast, and energy stored in inductors is not a concern with these lamps.

RPC dimming of incandescent lighting was disclosed by R. M. Burkhart et al., *IEEE Trans. Ind. Appl.* vol. 1A-15, pp. 579-582, September/October, 1979 (see also *IEEE Trans. Ind. Appl*, Vol. 1A-8, pp. 84-88 January/February, 1972). The circuit disclosed by Burkhart et al. includes a filter, or snubber, capacitor ($C_3$ in FIG. 2 of the 1979 paper) connected from line hot to load hot. However, as discussed in the 1979 paper, pp. 581, 582, a single capacitor value is not satisfactory over a large range of loads, and the capacitance must be varied to accommodate changes in the load.

An approach to the load dependence of RPC dimming was disclosed by C. F. Christiansen and M. Benedetti, *IEEE Trans. Ind. Appl.* vol. 1A-19, May/June 1983, pp. 323-327. They corrected the load dependence of an RPC incandescent dimming circuit by switching using a power field-effect transistor (FET) in the active region. The falloff time when the switch opends can be controlled by circuitry that does not depend on the load. However, because the FET is in the active region, it dissipates power, which is undersirable for a number of reasons. The power dissipated in the switch constitutes wasted power that is costly, that speeds the rate of thermal degradation of the product elements, and that requires a larger dimmer, in order to dissipate the additional heat safely.

Bloomer has disclosed RPC dimming of a.c. loads, including incandescent lamps. (See U.S. Pat. Nos. 4,528,494 and 4,540,893). His switching is accomplished using FETs in the active region, which causes excessive power dissipation. He has also disclosed a protection circuit for controlled-conduction circuits (U.S. Pat. No. 4,547,828). However, he requires complex circuits that include direct line voltage input to the control section, which is undersirable, particularly when a capacitive load is being controlled. In that case, the switch may be turned on when there is a voltage across the load capacitor, which can cause high surge currents, electromagnetic interference, and lamp buzzing.

SUMMARY OF THE INVENTION

In accordance with the present invention, a circuit for controlling power from an a.c. line to an incandescent lighting load comprises:

(a) switch means to turn power to said load on and off and (b) control means to
 (i) cause said switch means to turn on when line voltage is substantially equal to load voltage,
 (ii) cause said switch means to turn off at a selected time later during each half cycle, and
 (iii) ensure that said switch means turns off when a voltage across said switch means exceeds a predetermined value.

The switch means preferably comprises a transistor. The switch means is considered to be closed when the transistor is in its conducting state and open when the transistor is in its non-conducting state.

In an alternative embodiment, a circuit for controlling power from an a.c. line to an incandescent lighting load comprises:

(a) switch means to turn power to said load on and off;
(b) supply means to provide power to said switch means;
(c) firing means to open said switch means at a selected time during each half cycle; and
(d) control means, having no direct line voltage input and serving to
 (i) close said switch means when the difference between line voltage and load voltage is substantially equal to zero and
 (ii) open said switch means at any time that the difference between line voltage and load voltage exceeds a predetermined value.

A circuit of this invention permits quiet, load-independent incandescent lamp dimming by reverse phase control, without complex circuitry. The circuit is particularly adapted for dimming loads that include solid state transformers.

DETAILED DESCRIPTION OF THE INVENTION

The present invention provides an improved circuit for dimming a.c. loads, such as incandescent lighting loads, by reverse phase control (RPC). Unlike earlier circuits of this type, which either showed strong load dependence or avoided load dependence by using complex circuitry, the present circuit can dim loads having a broad range of power ratings but is relatively simple.

Conventional phase-controlled dimming operates by delaying the time at which power to the load turns on during each a.c. half-cycle. The longer the delay, the less power is provided to the load. When the power to the load turns on, there is a sudden current surge which, if the load is an incandescent lamp, can cause the lamp filament to vibrate and generate unwanted noise. Noise problems are particularly pronounced when the lamps are low voltage incandescent lamps using solid state transformers. Solid state transformers change 60 Hz line voltage to high frequency ($\geq 20,000$ Hz) and then reduce the voltage (typically to ~12 volts). The transformers has a capacitor on the input. When dimmed by a conventional phase-controlled dimmer, the capacitor draws large current pulses, which, in turn, can cause dimmer buzz, transformer buzz, interference with other circuits, and flicker. These problems can be alleviated to some extent by adding a filter choke; however, the choke adds substantial cost and weight to the dimmer, reduces the maximum power to the load, and is not entirely successful.

Figure 1A:
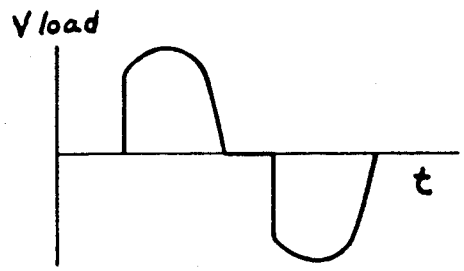
FIGS. 1A and 1B depict the time dependence of load voltage for conventional and reverse phase controlled dimming, respectively.
Figure 1B:
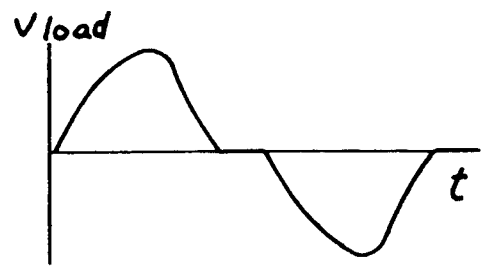

There are significant advantages to dimming an incandescent lamp by RPC, particularly when the lamp is a low voltage lamp using a solid state transformer. Instead of delaying the onset of power to the load, an RPC circuit turns the power on at or near the beginning (zero crossing) of each half cycle. Dimming is accomplished by subsequently turning the power off during each half cycle. The less time elapsed before the power is turned off, the less power to the lamp. Thus, dimming is accomplished by varying the time interval during which the power is provided, before it is turned off. The time dependence of load voltage during the course of a cycle is shown for conventional and reverse phase-controlled dimming in FIGS. 1A and 1B, respectively.

Prior art RPC dimming circuits for incandescent lamps incorporate a snubber capacitor across the switch to reduce the rate of change of current through the load. As a result, both lamp noise and radio frequency interference are reduced. However, a single snubber capacitor will not serve for a range of loads. For high wattage loads, the lamp noise is not adequately reduced, while for low wattage loads, current through the capacitor prevents the lamps from turning off completely. Consequently, complex circuitry was added to provide changing values of capacitance to accomodate different load wattages. Circuits developed more recently have eliminated the need for changing capacitors to fit different loads, but only by using a transistor in its active region, which dissipates excessive power.

Figure 2:
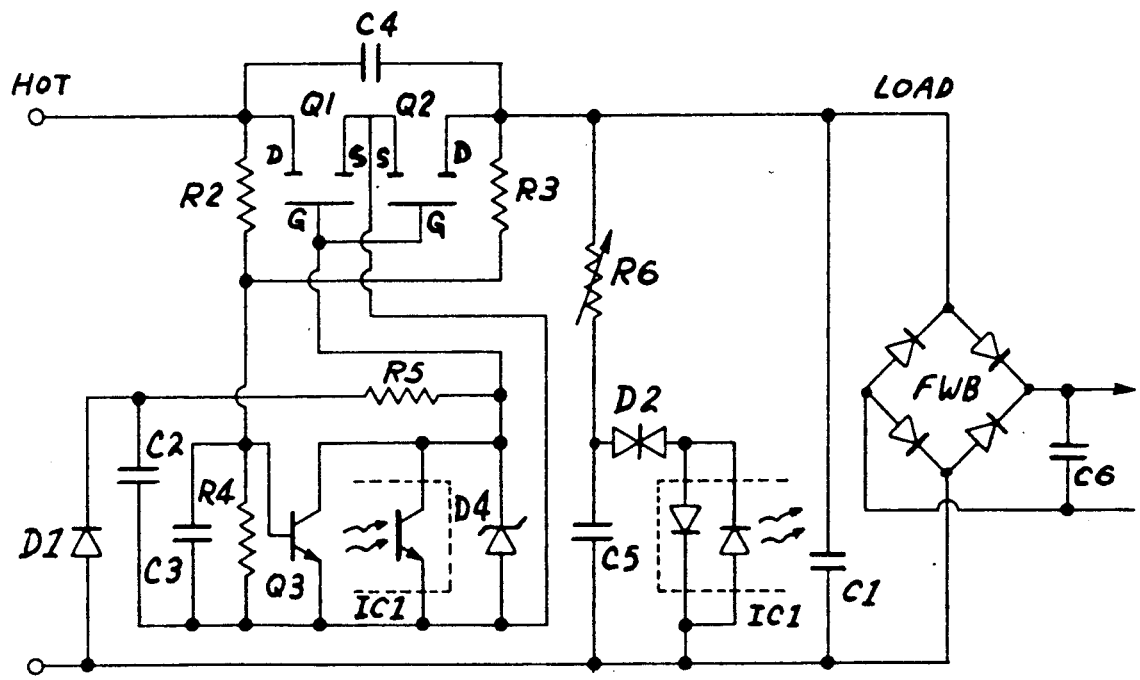
FIG. 2 is a circuit diagram of an embodiment of the present invention.

A circuit of the present invention is depicted in FIG. 2. To simplify the discussion of the circuit, it is convenient to divide it into four sections, whose general functions are as follows:

A. Switch Section—This section turns power to the load on and off.
B. Supply Section—This section provides power to the switch section.
Firing Section—This section determines the time within each a.c. half cycle to turn off power to the load.
D. Control Section—This section detects the zero crossing and signals the switch section to turn on power to the load. This section also protects the circuit by turning off power to the load when currents or temperatures are too high. After the power to the load is off, this section maintains the Switch Section in the off position.

The Switch Section comprises elements $Q_1$ and $Q_2$ in FIG. 2. Although it is possible to use only one transistor in the Switch Section, preferably these two transistors act together as the main switch, one for the positive half cycle of the a.c. signal and the other for the negative half cycle. Field-effect transistors are the preferred transistors for $Q_1$ and $Q_2$, but insulated gate transistors (IGTs), bipolar transistors, or any other electronic switching devices are suitable alternatives to FETs. A FET in combination with a diode bridge is a less expensive alternative to two FETs, but it generates more heat. The IGT is better at high currents, but not at low currents. An IGT with a diode bridge or, more preferably, 2 IGTs with anti-parallel diodes—an IGT-diode pair for each half-cycle—constitute the preferred switch. Optional capacitor $C_4$ provides R. F. I. filtering.

The Supply Section comprises elements $D_1$, $C_2$, $R_5$, and $D_4$ in FIG. 2. These elements combine to provide a voltage to the common point of $D_4$, $R_5$, and the gate of $Q_1/Q_2$. The values of the Supply Section circuit elements are chosen to provide to the gate of $Q_1/Q_2$ sufficient voltage to turn the device on fully, but not enough to damage the gate—typically, 12 volts. In the absence of additional circuitry, the Supply Section would always apply a voltage to the gate of $Q_1/Q_2$; $Q_1$ and $Q_2$ would always be on; and power would always be supplied to the load. That mode of operation is altered by the Firing and Control Sections, which signal $Q_1/Q_2$ to open and close at appropriate times.

The Firing Section comprises elements $R_6$, $C_5$, $D_2$, and IC1 in FIG. 2. Beginning at a time when $Q_1/Q_2$ is on and capacitor $C_5$ is discharged, $C_5$ charges through variable resistor $R_6$ to a voltage that causes diac $D_2$ to break over, at which point capacitor $C_5$ discharges through optocoupler IC1. The transistor output of optocoupler IC1 turns on, resulting in the $Q_1/Q_2$ gate being discharged, turning off the main switch. The fraction of time that power is provided to the load depends on the time it takes to charge capacitor $C_5$, which, in turn, depends on the value of variable resistor $R_6$. Thus, the power to the load can be controlled by varying resistor $R_6$.

The Control Section comprises elements $R_2$, $R_3$, $R_4$, $C_3$, and $Q_3$ of FIG. 2. The voltage that appears between $R_2$ and $R_3$ is the voltage drop across the main switch, $Q_1/Q_2$ ($V_{Line} - V_{Load}$). Resistors $R_4$ and either $R_2$ or $R_3$ form a voltage divider that determines the value of $V_{Line} - V_{Load}$ (say $V_T$) that causes $Q_3$ to change state. Zener diode $D_4$ limits the value of $V_{GS}$. Thus, starting with the main switch open, when the value of $V_{Line} - V_{Load}$ falls below $V_T$ (i.e., $V_{Line} \sim V_{Load}$), $Q_3$ turns off, and $V_{GS}$ rises to a certain level (determined by the supply circuit), at which time switch $Q_1/Q_2$ closes. Later in the cycle, the firing circuit opens $Q_1/Q_2$, $V_{Line} - V_{Load}$ rises, and the voltage at the base emitter of $Q_3$ rises at a rate limited by the RC time constant of optional resistor $R_4$ and optional capacitor $C_3$. When $V_{Line} - V_{Load}$ exceeds $V_T$, $Q_3$ turns on, driving $V_{GS}$ rapidly to zero and clamping $Q_1/Q_2$ open until $V_{Line} - V_{Load}$ again falls below $V_T$. $C_3$ provides good noise immunity by preventing $Q_3$ from switching states unless $V_T$ is reached for at least a minimum length of time (~RC charging time constant). Although FIG. 2 shows a transistor $Q_3$ that is distinct from the output transistor of IC1, the two transistors can be combined into one. The single transistor is turned on when it receives a pulse from the firing circuit or when $V_{Line} - V_{Load}$ rises above $V_T$. $Q_3$ is preferably a bipolar transistor, but, alternatively, it may be a thyristor. Note that there is no direct line voltage input to the Control Section; rather, just $V_{Line} - V_{Load}$.

In one embodiment of the present invention, as is discussed in more detail later, the load includes a rectifier FWB and filter capacitor $C_6$.

Figure 3:
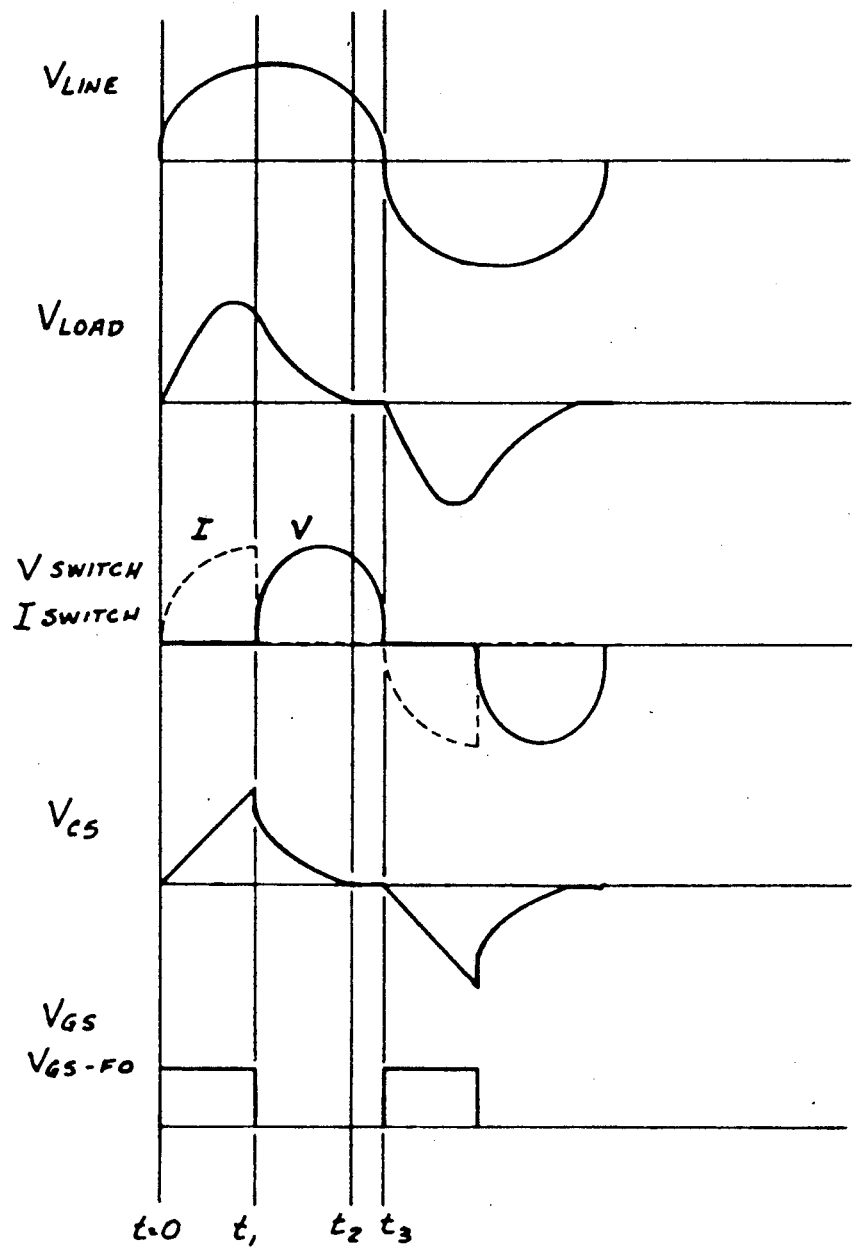
FIG. 3 depicts the time dependence of various circuit voltages during the course of a single cycle.

The sequence of events over the course of a cycle is depicted in FIG. 3. At time $t=0$, the main switch is closed and $Q_3$ is off. As $C_5$ charges, it reaches a voltage (at $t_1$) that causes diac $D_2$ to turn on, firing the optocoupler IC1 and causing the main switch to open. The voltage across the switch rises rapidly, causing $Q_3$ to turn on and clamp the main switch in the open position. The load voltage falls at a rate determined by the load capacitance. With a capacitive load, the fall in load voltage is not very rapid and lamp buzzing and electromagnetic interference are less of a problem than with earlier dimmers. Thus, if necessary, a capacitor ($C_1$ in FIG. 2) may be connected between the load supply leg and return leg. As the line voltage approaches the zero crossing ($t_3$), $V_{Switch}$ (i.e., $V_{Line} - V_{Load}$) falls below $V_T$ (at $t_2$), turning $Q_3$ off and causing the main switch $Q_1/Q_2$ to close. The events repeat during the negative half cycle beginning at $t_3$. A malfunction in the circuit, such as over temperature or over current, while $Q_3$ is off and $Q_1/Q_2$ is closed, will generally cause the voltage across $Q_1/Q_2$ to go up. If the voltage rises above $V_T$, then $Q_3$ turns on, causing $Q_1/Q_2$ to open. This provides over-current protection for the transistor, which is important, because transistors generally cannot tolerate current surges. Note that very little power is dissipated in the switch, since $V_{Switch}$ and $I_{Switch}$ are not large simultaneously.

"Real time" voltage regulation is readily achieved by RPC dimming. If load voltage and load current are sensed and combined (starting at $t=0$ in FIG. 3), then the resulting product can be integrated until the integrated energy reaches a pre-determined level, at which point ($t_1$) the main switch can be opened. Voltage regulation in conventional phase-controlled dimming is not "real time" since it is the onset of load power, rather than its termination, that is controlled. Thus, in conventional dimming, once power is being delivered to the load, in any cycle, the power is not controlled before the next zero crossing. In the present invention, good voltage regulation is accomplished as described below, even without measuring integrated energy and comparing it with a reference. By voltage regulation, we mean compensating for changes in line voltage V. The parameter that is to be regulated is the power to the load, P. Thus, the voltage regulation can be specified as $dP/dV$, with the best regulation corresponding to the lowest value.

As was discussed above and depicted in FIG. 3, the sequence that determines the time at which the main switch opens begins with the charging of capacitor $C_5$. During the time that $C_5$ is being charged, the main switch is closed and power is delivered to the load. If the line voltage is reduced below its normal value, then the instantaneous load power is correspondingly reduced. However, the reduction in line voltage causes a corresponding reduction in the rate at which $C_5$ charges. Thus, the main switch is opened at a time later than $t_1$, and the area under the curve of $V_{Load} V_{time}$, which is a measure of the power delivered to the load, remains nearly constant. Similarly, if the line voltage is increased above its normal value, $C_5$ charges more rapidly, the main switch opens at a time earlier than $t_1$, and the power delivered to the load is again nearly constant.

Strictly speaking, the voltage regulation depends on the setting of $R_6$. Clearly, if $R_6$ has been adjusted so that the firing circuit opens the main switch when $t_1 \sim t_3$, there may be little or no capacity to extend the time for opening the switch to compensate for low line voltage.

Thus, although the voltage regulation is not a constant (i.e., characteristic of a circuit), typical values of voltage regulation ($dP/dV$) for the present circuit are about 1% or less and are half, or less than half, the values of $dP/dV$ for circuits using conventional phase control.

Low power dissipation in main switch $Q_1/Q_2$ is a key attribute of the present circuit and is accomplished by substantially never operating the switch in the active region. The active region is that in which $V_{GS}$ is intermediate between 0 and the voltage necessary to turn the device fully on ($V_{GS\text{-}FO}$—typically 12V for a FET or IGT). As was discussed above and depicted in FIG. 3, $V_{GS}=V_{GS\text{-}FO}$ during the time power is delivered to the load, then falls rapidly to zero when the firing circuit initiates the opening of the main switch. Preferably, the main switch opens in less than about 200 μs. Typically, with the circuit of FIG. 2, the main switch opens in less than about a microsecond, even in the failure mode, when the voltage across the main switch rises because of overheating or overcurrent. Nevertheless, when the load has substantial capacitance, the load voltage falls slowly, thus providing low-noise operation. Although it opens rapidly, the main switch does not necessarily close rapidly. Its time constant for closing (determined by R5 and gate capacitance) is preferably long, to prevent a noise spike from closing the switch. However, the main switch closes near the zero-crossing point, at which time the voltage is at or near zero. Thus, although the switch may close with a long time constant, the power dissipation is still very small.

The RPC dimmer of the present invention is particularly adapted for use with low voltage lamps (i.e., incandescent lamps that operate at voltages below 50V, typically less than 15V). These lamps require a transformer when operated from conventional 120V lines, and solid state transformers are being increasingly used for that purpose. When a dimmer of the present invention is used with a low voltage lamp load that uses a solid state transformer, there is no need to provide a capacitor (like $C_1$ in FIG. 2) from the load supply leg to the return leg, because the capacitor is in the transformer.

In another embodiment of the present invention, an RPC dimmer controls power from an a.c. line to a load that includes a rectifier and a filter capacitor in closed series relationship with the d.c. side of the rectifier; that is to say, across the d.c. side. The dimmer of this embodiment can use a circuit that turns power on to the load when line voltage equals load voltage or, alternatively, a circuit that turns power on when line voltage is zero (i.e., at the zero crossing). The rectifier and filter capacitor may comprise elements of a solid state transformer for powering low voltage incandescent lamp or, alternatively, may comprise elements of a ballast for a gas discharge lamp, such as a high intensity discharge lamp, cold cathode (e.g., neon/cold cathode) lamp, or fluorescent lamp.

In still another embodiment of the present invention, an RPC dimmer controls power from an a.c. line to an incandescent lighting load that includes a capacitor from dimmed hot to neutral. The dimmer can either use a circuit that turns power on to the load when line voltage equals load voltage or one that turns power on to the load when line voltage is zero. These RPC dimmers can also be used to control power to a fan or a low voltage incandescent lamp.

We claim:

1. A circuit for controlling power from an a.c. line to an incandescent lighting load comprising, in combination, (a) switch means to turn power to said load on and off and
(b) control means to
  (i) cause said switch means to turn on when line voltage is substantially equal to load voltage,
  (ii) cause said switch means to turn off at a selected time later during each half cycle, and
  (iii) ensure that said switch means turns off when a voltage across said switch means exceeds a predetermined value.

2. The circuit of claim 1 further comprising
supply and return legs to and from said load and
a capacitor having a first terminal connected to said supply leg and a second terminal connected to said return leg.

3. The circuit of claim 1 in which said switch means comprises a field effect transistor.

4. The circuit of claim 3 in which said switch means comprises a field effect transistor for the positive half cycle of said a.c. power and a second field effect transistor for the negative half cycle.

5. The circuit of claim 1 in which said switch means comprises a field effect transistor in combination with a diode bridge.

6. The circuit of claim 1 in which said switch means comprises an insulated gate transistor.

7. The circuit of claim 6 in which said switch means comprises an insulated gate transistor for the positive half cycle of said a.c. power and a second insulated gate transistor for the negative half cycle.

8. The circuit of claim 1 in which said switch means comprises a bipolar transistor.

9. The circuit of claim 1 in which said control means includes means for varying the time for turning off said switch means, in response to variations in line voltage, to provide substantially constant power to said load.

10. The circuit of claim 1 in which said load comprises at least one low voltage lamp.

11. The circuit of claim 10 further comprising a solid state transformer to power said load.

12. The circuit of claim 2 further comprising a capacitor connected in closed series relationship with said switch means.

13. A circuit for controlling power from an a.c. line to an incandescent lighting load comprising, in combination,
(a) switch means to turn power to said load on and off;
(b) supply means to provide power to said switch means;
(c) firing means to open said switch means at a preselected time during each half cycle; and
(d) control means, having no direct line voltage input and serving to
  (i) close said switch means when the difference between line voltage and load voltage is substantially equal to zero and
  (ii) open said switch means at any time that the difference between line voltage and load voltage exceeds a predetermined value.

14. The circuit of claim 13 in which said control means comprises a transistor, whose state determines whether said switch means is to be open or closed.

15. The circuit of claim 14 in which said transistor is a bipolar transistor.

16. The circuit of claim 13 in which said control means comprises a thyristor, whose state determines whether said switch means is to be open or closed.

17. The circuit of claim 13 in which said control means comprises means to establish said predetermined voltage.

18. The circuit of claim 17 in which said voltage establishment means comprises at least one resistor.

19. The circuit of claim 18 in which said voltage establishment means further comprises a zener diode.

20. The circuit of claim 13 in which said control means comprises a capacitor to filter the difference between said line voltage and said load voltage.

21. The circuit of claim 13 in which said control means comprises
(a) a transistor, whose state determines whether said switch means is to be open or closed,
(b) a voltage divider to establish said predetermined voltage, and
(c) a capacitor to filter the difference between said line voltage and said load voltage.

* * * * *